(12) United States Patent
Tangvald et al.

(10) Patent No.: US 6,574,680 B1
(45) Date of Patent: Jun. 3, 2003

(54) DEVICE AND METHOD TO ENABLE INTERRUPT HANDLING AND CONTROL FOR MASS STORAGE DEVICES INTERFACING TO DIFFERENT CONTROLLERS

(75) Inventors: Matthew B. Tangvald, Portland, OR (US); Barry Kennedy, Hillsboro, OR (US); Kristine McCalla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,752

(22) Filed: Dec. 29, 1999

(51) Int. Cl.$^7$ ................................................ G06F 3/00
(52) U.S. Cl. .......................... 710/10; 710/104; 713/1
(58) Field of Search ........................ 710/8–14, 62–72, 710/104; 713/1

(56) References Cited

U.S. PATENT DOCUMENTS

| | | | | |
|---|---|---|---|---|
| 5,790,895 A | * | 8/1998 | Krontz et al. | 710/64 |
| 5,948,076 A | * | 9/1999 | Anubolu et al. | 710/8 |
| 6,061,746 A | * | 5/2000 | Stanley et al. | 710/10 |
| 6,098,119 A | * | 8/2000 | Surugucchi et al. | 710/10 |
| 6,295,565 B1 | * | 9/2001 | Lee | 710/301 |
| 6,425,079 B1 | * | 7/2002 | Mahmoud | 713/2 |
| 6,446,139 B1 | * | 9/2002 | Leung et al. | 710/1 |

* cited by examiner

*Primary Examiner*—Paul R. Myers
(74) *Attorney, Agent, or Firm*—Antonelli, Terry, Stout & Kraus, LLP

(57) ABSTRACT

A device and method to enable a plug and play operating system to load the appropriate device for either a SCSI I/O device or a RAID adapter and direct interrupts from storage devices to the appropriate device driver. This device and method has a SCSI I/O device connected to several storage devices. The SCSI device can generate several interrupt signals and an identification selection signal. Further, this device and method has a PCI slot, to accept a RAID adapter, connected to the SCSI I/O device. The PCI slot can receive and generate several interrupt signals, as well as an interrupt disable signal, and an identification disable signal. Several tristate units are connected to the interrupt signals from the SCSI I/O device, the identification selection, the interrupt disable signal, and the identification disable signal. When a RAID adapter is plugged into the PCI slot, the tristate units route the interrupt signals from the SCSI I/O device to the PCI slot and disable the identification selection signal so that the plug and play operating system does not recognize the SCSI I/O device and does not load a device driver for it.

18 Claims, 3 Drawing Sheets

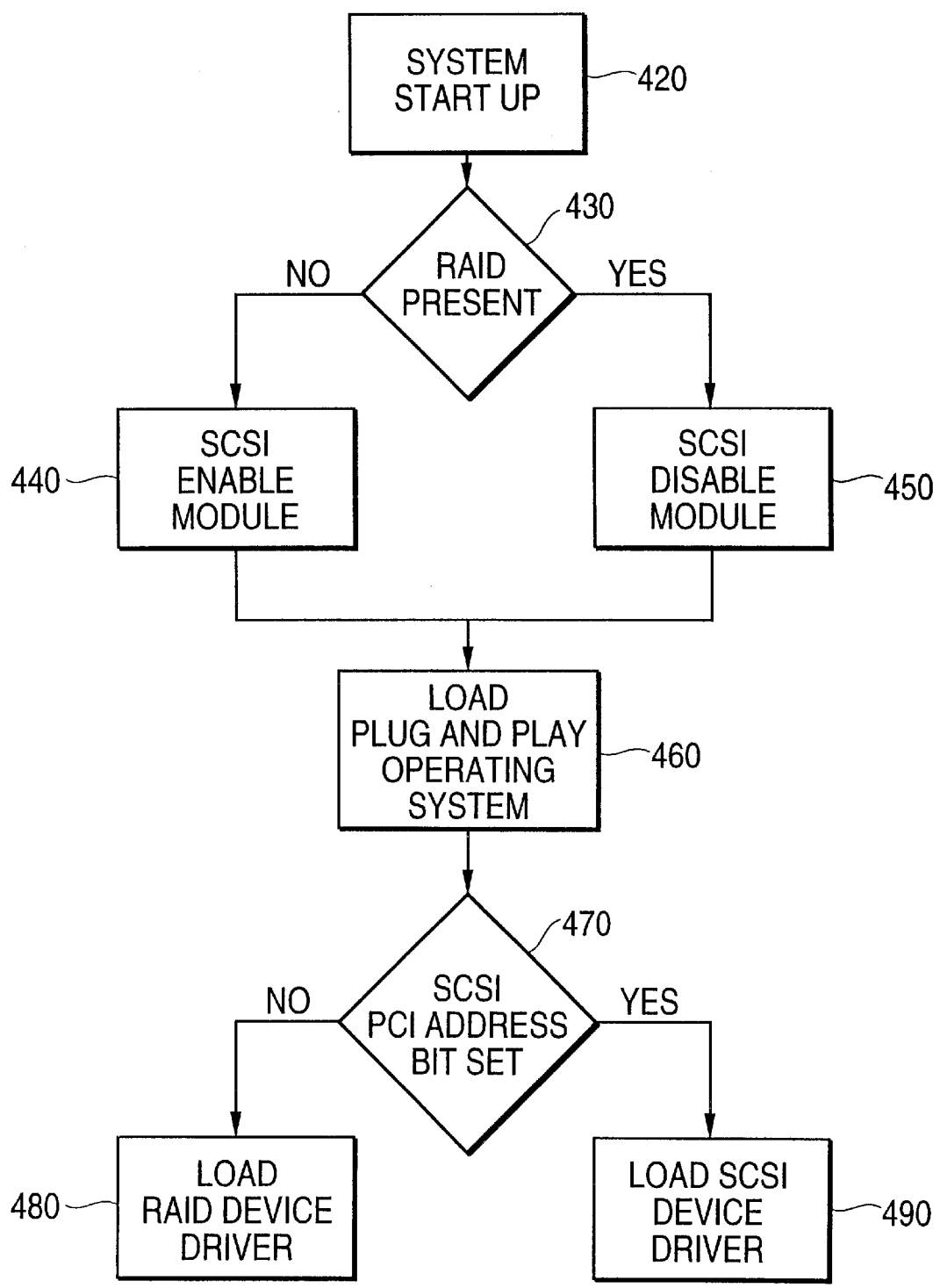

DEVICE AND METHOD TO ENABLE INTERRUPT HANDLING AND CONTROL FOR MASS STORAGE DEVICES INTERFACING TO DIFFERENT CONTROLLERS

FIELD

The invention relates to a device and method to enable interrupt handling for mass storage devices interfacing to different controllers and the loading of the proper device driver for the controller used.

BACKGROUND

Microprocessor-based systems have for some time been using small computer system interface (SCSI) to connect and control peripheral devices such as disk drives used for mass storage of data. This SCSI form of interface for disk drives has become so popular that the manufacturers of computer base boards (also known as mother boards) have incorporated the SCSI disk controller directly into the computer base boards. With the SCSI disk controller implemented directly on the computer base board a separate SCSI disk controller that would plug into the computer base board is not required and the user of such a computer base board would not require the purchasing of such a separate SCSI disk controller.

More recently peripheral component interconnect (PCI) redundant array of independent disks (RAID) controllers have also become popular due to the large number disk drives, volume of data per drive, relatively low cost of the drives, and their ability to control both RAID drives and SCSI disk drives. Therefore, the manufacturers of computer base boards have provided PCI slots on the computer base boards for RAID disk controllers in addition to the SCSI disk controller which is incorporated in the computer base board itself. By having both a RAID disk controller and a SCSI disk controller in a single system, a large number of both types of disk drives can be supported. However, the integrators or original equipment manufacturers (OEMs) of personal computers have not seen a large demand for both types of disk drives on a single system. Further, these OEMs have objected to the presence of ports for both SCSI disk drives and RAID disk drives since they take up space in the cabinet and add cost to the computer system in a very competitive market. Therefore, since a RAID disk controller could control SCSI disk drives and the interface for SCSI drives already exists on the computer base board, a zero-channel RAID (ZCR) disk controller was developed. This ZCR may optionally not interface to RAID disk drives but would interface to SCSI disk drives through the computer base board.

As would be appreciated by one of ordinary skill in the art, the presence of a SCSI disk controller built into a computer base board and a ZCR disk controller, that actually is used control the SCSI disk drives, could create a problem if on starting up the computer system the operating system loaded both a SCSI device driver and a RAID device driver. If both types of device drivers were loaded and attempted to access the SCSI disk drives, this would in most cases cause a complete system failure. However, this has not been a significant issue when using the older operating systems such as DOS, Windows 3.1™, Windows NT™, and Windows 95™, since it is possible to specify either which device drivers may be loaded on system start up or which device drivers would not be loaded. This is not the case with the newer plug and play operating systems such as Windows 2000™.

In the newer plug and play operating systems, each time the computer system is started, the operating system will check for all devices and controllers on the system. The operating system will then load a device driver for devices and controllers discovered on the system. These device drivers both control and field interrupts from the controllers and devices. Therefore, installing new devices under plug and play operating systems, such as Windows 2000™, is a simple matter of plugging them in and turning on the computer system. However, when Windows 2000™ discovers the presence of a SCSI disk controller on the computer base board and a ZCR disk controller, Windows 2000™ will load a device driver for both. Further, the option of loading only designated device drivers or not loading designated device drivers is unavailable under Windows 2000™. With both device drivers trying to field interrupts and communicating to the same disk drives at the same time the computer system will experience a total failure.

Therefore, what is needed is a device and method in which only the ZCR is discovered by the plug and play operating system while the SCSI disk controller on the computer base board is masked or hidden from discovery by the plug and play operating system. Thus, upon system start up only a device driver for the ZCR is loaded by the plug and play operating system and not one for the SCSI disk controller. Further, as interrupts are generated by the SCSI disk drives, these interrupts should be passed through the ZCR rather than the SCSI disk controller so that they may be handled by the ZCR device driver.

SUMMARY

The present invention is directed to a device to route interrupts from several storage devices and install an appropriate device driver by a plug and play operating system to field the interrupts and control the disk drives. This device has a SCSI I/O device connected to several storage devices having a several interrupt signals and an identification selection signal. Further, this device has a PCI slot, to accept a RAID adapter, connected to the SCSI I/O device having several interrupt signals, an interrupt disable signal, and an identification disable signal. Still further, this device has several tristate units connected the interrupt signals from the SCSI I/O device, the identification selection, the interrupt disable signal, and the identification disable signal. When the RAID adapter is plugged into the PCI slot, the tristate units route the interrupt signals from the SCSI I/O device to the PCI slot and disable the identification selection signal so that the plug and play operating system does not recognize the SCSI I/O device.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 3 is a diagram of another example embodiment of the present invention showing a modular configuration and flowchart of the systems, methods and processes shown in FIG. 2.

DETAILED DESCRIPTION

Figure 1:
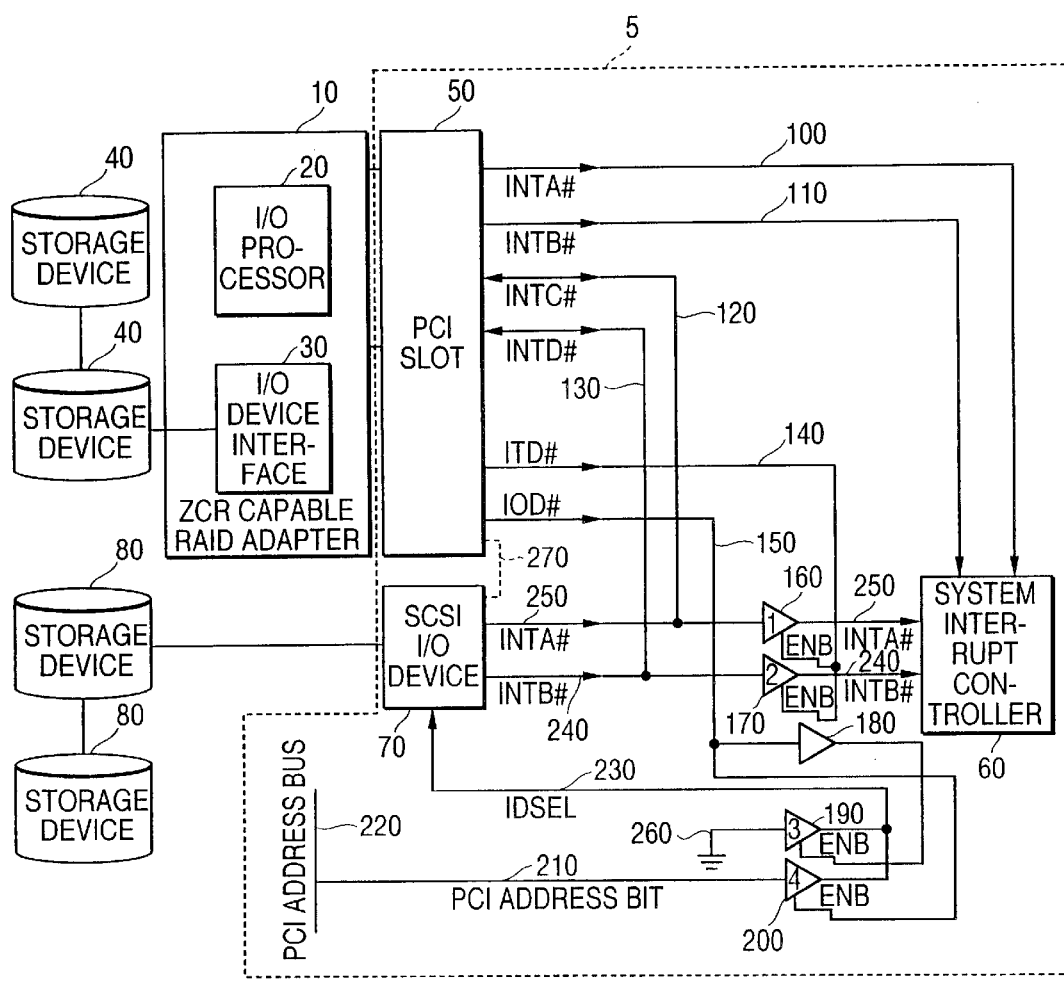
FIG. 1 is an overall system diagram showing both a RAID adapter and a SCSI input/output device interfacing to a system interrupt controller and the PCI address bus in an example embodiment of the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known power connections to integrated circuits and other components may not be shown within the FIGS. for simplicity of illustration and discussion, and so as not to obscure the invention.

FIG. 1 is an overall system diagram of an example embodiment of the present invention. A zero channel RAID (ZCR) capable redundant array of independent disks (RAID) adapter (RAID adapter) 10 is shown having an input/output (I/O) processor 20 and an I/O device interface 30 used to communicate to RAID storage devices 40 that may be disk drives or other mass storage devices. As previously discussed, the ZCR capable RAID adapter 10 may not require the presence of the RAID storage devices 40. When such RAID storage devices 40 are not present, then the I/O device interface 30 may not be required. However, whether the RAID storage devices 40 are present or absent, the I/O processor 20 may be used to control the small computer system interface (SCSI) storage device 80 and field interrupts generated by these SCSI storage device 80 through RAID/SCSI interconnect 270.

The RAID adapter 10 plugs into a peripheral component interconnect (PCI) slot 50 located on computer base board 5. As would be appreciated by one of ordinary skill in the art, only a small portion of the computer base board 5 is shown which is directly relevant to the present invention. On the base board 5 is also located a system interrupt controller 60 which handles all interrupts generated in this example embodiment and in turn generates interrupts to the processor (not shown). At least four lines feed into the system interrupt controller 60. At least two of these lines come from the PCI slot 50 connected to the RAID adapter 10 and are labeled RAID interrupt A (INTA#) 100 and RAID Interrupt B (INTB#) 110. Each of the lines, RAID interrupt A 100 and RAID Interrupt B 110, may be associated with at least a single RAID disk drive 40 and, as will be discussed in detail ahead, SCSI storage device 80. Again, at least two of the above mentioned at least four lines come from the SCSI I/O device 70 and are labeled SCSI interrupt A (INTA#) 250 and SCSI interrupt B (INTB#) 240. As will be discussed in detail ahead, when the RAID adapter 10 is not present on the system, SCSI interrupt A 250 and SCSI interrupt B 240 would be used to generate interrupts on behalf of the SCSI storage devices 80 directly into the system interrupt controller 60. Further, SCSI interrupt A 250 may be connected to RAID interrupt C (INTC#) 120 which may be connected to PCI slot 50 to generate an interrupt to RAID adapter 10 when it is present. Also, SCSI interrupt B (INTB#) 240 may be connected to RAID interrupt D (INTD#) 130 which in turn may be connected to PCI slot 50 to generate an interrupt to RAID adapter 10 when it is present.

In addition to the lines mentioned above, the PCI slot 50 has two additional lines referred to as interrupt disable (ITD#) 140 and identification disable (IDD#) 150. Interrupt disable 140 may be connected to first tristate unit 160 and second tristate unit 170 and when the RAID adapter is not plugged into the PCI slot 50, interrupt disable 140 may be set to one (high) and when the RAID adapter 10 is plugged into the PCI slot 50, interrupt disable 140 may be set to zero (low). As will be discussed in further detail ahead under interrupt steering, when interrupt disable 140 is zero (low) this may disable the first tristate unit 160 and second tristate unit 170 preventing interrupts from propagating down SCSI interrupt A 250 and SCSI interrupt B 240 to system interrupt controller 60.

As mentioned above, identification disable 150 is also a line that exits the PCI slot 50 and may be connected to inverter 180 and then third tristate unit 190 which in turn may be connected to ground 260. Further, identification disable 150 may be also directly connected to fourth tristate unit 200 which in turn may be connected to the third tristate unit 190 and identification selection (IDSEL) 230. Still further, the fourth tristate unit 200 may be connected to PCI address bit 210 which in turn may be connected to PCI address bus 220. As will be discussed in detail ahead under identification selection routing, when the RAID adapter 10 is not plugged into the PCI slot 50, identification disable 150 may be set to one (high) and when the RAID adapter is plugged into the PCI slot 50, identification disable 150 may be set to zero (low). As will be discussed in further detail ahead under identification selection routing, when identification disable 150 is zero (low) this may enable the third tristate unit 190 and may disable the fourth tristate unit 200 preventing the setting of PCI address bit 210 which prevents a plug and play operating system such as, but not limited to, Windows 2000™ from determining that the SCSI I/O device 70 is present and therefore not loading a device driver for it.

Interrupt Steering

In the discussion of the device and method used by example embodiments of the present invention to steer interrupts generated by the SCSI storage devices 80 to the RAID adapter 10, reference will be made simultaneously to FIGS. 1 through 3.

Figure 2:
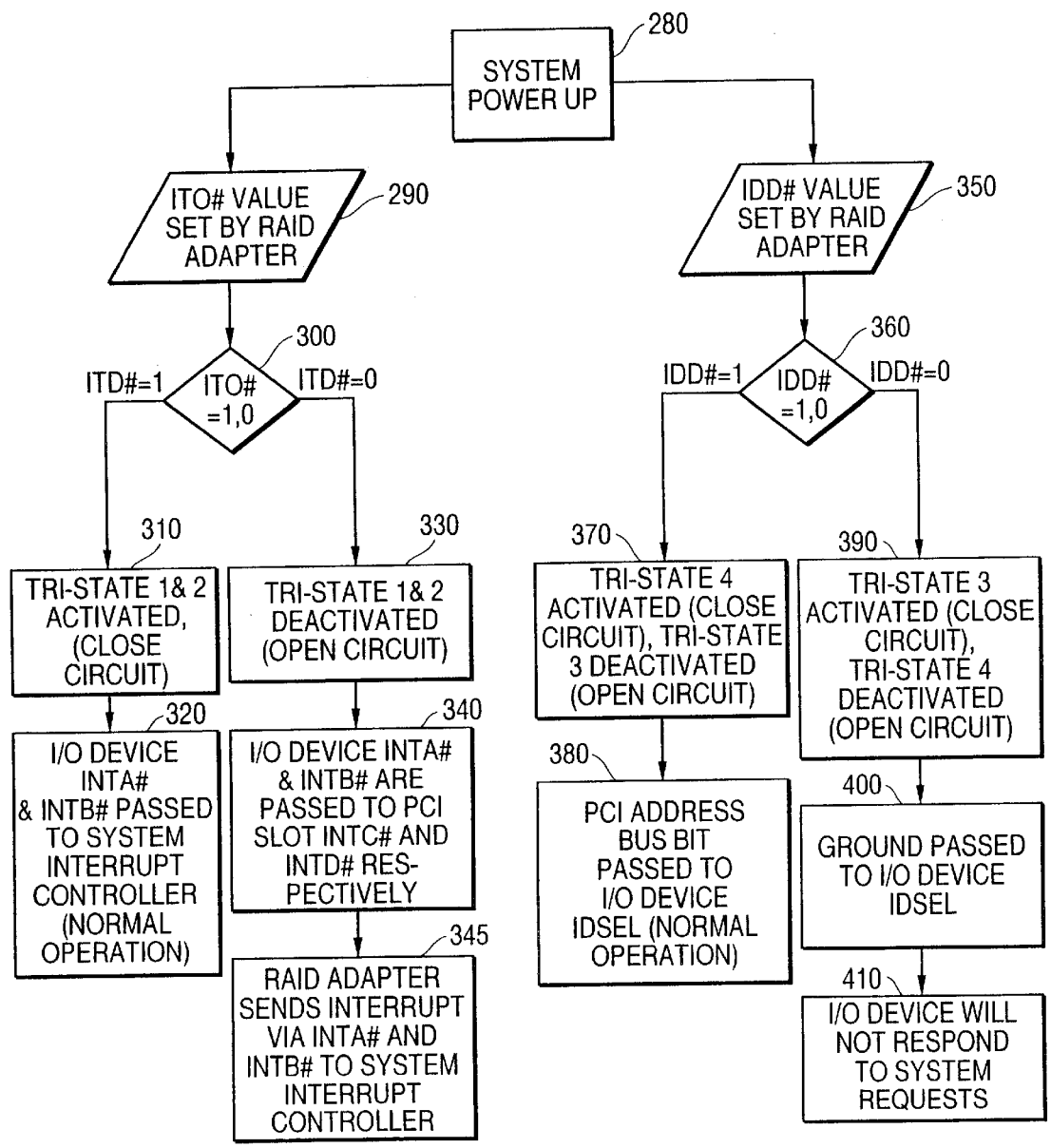
FIG. 2 is a flowchart showing the operation of the example embodiment of the present invention shown in FIG. 1.

As previously discussed in reference to FIG. 1, upon system power or start up, as shown in operation 280 of FIG. 2 and operation 420 of FIG. 3, the presence of the RAID adapter 10, determined in operation 430 of FIG. 3, may cause the Interrupt disable 140 and the identification disable 150 to both be set to zero (low). This setting of the Interrupt disable 140 and Identification disable 150 to zero (low) is accomplished by the RAID adapter 10 as shown in operation 290 and operation 350 of FIG. 2. If the RAID adapter 10 is not present, then the normal or default condition for the Interrupt disable 140 and the identification disable 150 is for both to be set to one (high). Where the Interrupt disable 140 and the identification disable 150 are both set to one (high), as shown in operations 300 and 360 of FIG. 2, then the determination may be made that the RAID adapter 10 is not present in operation 430 and execution proceeds to operation 440 of FIG. 3. Operation 440 of FIG. 3 executes a SCSI enable module which may include software, firmware and hardware contained in operations 310, 320, 370 and 380 shown in FIG. 2.

Referring to FIG. 2, once it is determined that the Interrupt disable 140 is set to one (high) in operation 300, the SCSI enable module 440, shown in FIG. 3, begins by enabling first tristate unit 160 and second tristate unit 170 as shown in operation 310 of FIG. 2. As shown in FIG. 1 and operation 320 of FIG. 2, the enabling of the first tristate unit 160 and the second tristate unit 170 may allow for interrupts generated by SCSI storage devices 80 to pass through SCSI interrupt A 250 and SCSI interrupt B 240 via the SCSI I/O device 70 to the system interrupt controller 60.

However, if interrupt disable 140 is set to zero (low), caused by the presence of the RAID adapter 10 as determined by operation 430, then processing proceeds to execute a SCSI disable module 450, shown in FIG. 3, that may include the software, firmware or hardware included in operations 330, 340, 345, 390, 400 and 410 shown in FIG. 2 and discussed in detail ahead.

Referring to FIG. 2, processing proceeds to operation 330 since interrupt disable 140 is determined to be set to zero (low) in operation 300. In operation 330 the first tristate 160 and second tristate 170 may be both disabled. As shown in FIG. 1, since first tristate 160 and second tristate 170 are disabled, the signals from SCSI interrupt B 240 and SCSI interrupt A 250 cannot directly reach system interrupt controller 60. However, as further shown in FIG. 1, SCSI interrupt B 240 may be connected to RAID interrupt D 130 and SCSI interrupt A 250 may be connected to RAID interrupt C 120. Therefore, as provided in operation 340, shown in FIG. 2, when an interrupt is propagated down SCSI interrupt B 240 or SCSI interrupt A 250 it may be sent to RAID adapter 10 via RAID interrupt D 130 or RAID interrupt C 120, respectively. RAID adapter 10, in operation 345 shown in FIG. 2, then may generate an interrupt over RAID interrupt A 100 or RAID interrupt B 110 to system interrupt controller 60 for SCSI interrupt B 240 or SCSI interrupt A 250, respectively.

Therefore, using the interrupt steering device and method described above, the interrupts from the SCSI storage devices 80 may be directed (steered) to the system interrupt controller 60 when the RAID adapter 10 is not present using the SCSI enable module 440 shown in FIG. 3 and described in operations 310 and 320 shown in FIG. 2. However, when the RAID adapter 10 is plugged into the computer base board 5 via PCI slot 50, then using SCSI disable module 450 shown in FIG. 3, the interrupts from SCSI storage devices 80 may be blocked from directly going to system interrupt controller 60 and instead may be directed (steered) to RAID adapter 10 which then directs them to system interrupt controller 60 using the SCSI disable module 450, shown in FIG. 3, and described in operations 330, 340 and 345 shown in FIG. 2. Therefore, when the RAID adapter 10 is present, all interrupts for all disk drives are seen as generated through the RAID adapter 10 by the system interrupt controller 60.

Identification Selection Routing

So far in the discussion of the example embodiments of the present invention only the routing or steering of interrupts from SCSI storage devices 80 to the RAID adapter 10, when present, or directly to the system interrupt controller 60 when the RAID adapter is absent, has been discussed in detail. However, the routing or steering of interrupts to the RAID adapter will not solve the problem of loading both a SCSI disk device drive and RAID device driver when a plug and play operating system such as Windows 2000™, is used and a RAID adapter 10 is plugged into the computer base board 5. In the discussion of these example embodiments of the present invention this problem is resolved. As with the discussion of interrupt steering, the case where no RAID adapter 10 is present will be discussed first and then the discussion of the example embodiment where the RAID adapter 10 is present will be provided. In the discussion of this example embodiment of the present invention reference will be made to FIGS. 1, 2 and 3 simultaneously.

Referring to FIG. 2, the RAID adapter 10 may be determined not to be present in operation 430 of FIG. 3 by the RAID adapter not setting identification selection 230 to zero (low) in operation 350 and allowing the identification selection 230 to remain in its normal default condition of set to one (high). If the identification selection 230 is one (high) in operation 360, then as discussed above in reference to interrupt steering, it is determined in operation 430 of FIG. 3 that the RAID adapter 10 is not present and processing proceeds to execution of the SCSI enable module 440. The SCSI enable module 440, after completion of interrupt steering discussed previously, proceeds to execute operation 370 shown in FIG. 2 in which the fourth tristate unit 200 may be enabled and third tristate unit 190 may be disabled since the setting identification selection 230 value is changed by inverter 180 from a one (high) to a zero (low). This in turn allows for the setting of PCI address bit 210 by the SCSI I/O device 210 to indicate that it is present on the computer base board 5 in operation 380 of FIG. 2. Thereafter, in operation 460 of FIG. 3, a plug and play operating system, such as Windows 2000™, is loaded into memory (not shown) and executed by the processor (not shown). One of the many items a plug and play operating system first does upon booting is to poll the PCI address bus 220 to determine the devices and controllers that are on the system. In operation 470, shown in FIG. 3, one of the bits checked is a PCI address bit 210 set by the SCSI I/O device 70. Since the PCI address bit 210 is set, the plug and play operating system will load a SCSI device driver in operation 490 of FIG. 3.

Still referring to FIG. 2, the RAID adapter 10 may be determined to be present in operation 430 of FIG. 3 by the RAID adapter setting identification selection 230 to zero (low) in operation 350. When the identification selection 230 is zero (low) in operation 360, then as discussed above in reference to interrupt steering, it may be determined in operation 430 of FIG. 3 that the RAID adapter 10 is present and processing proceeds to execution of the SCSI disable module 450. The SCSI disable module 450, after completion of interrupt steering discussed previously, proceeds to execute operation 390, shown in FIG. 2, in which fourth tristate unit 200 may be disabled and third tristate unit 190 may be enabled since the setting identification selection 230 value is changed by inverter 180 from a zero (low) to a one (high). This in turn may prevent or block the setting of PCI address bit 210 by the SCSI I/O device 70 to indicate that it is present and allows ground (zero) to be passed to SCSI I/O device 70 via the identification selection signal 230 in operation 400 of FIG. 2. Thereafter, in operation 460 of FIG. 3, the plug and play operating system, such as Windows 2000™, is loaded into memory (not shown) and executed by the processor (not shown). As discussed earlier, one of the many items a plug and play operating system first does upon booting is to poll the PCI address bus 220 to determine the devices and controllers that are on the system. In operation 410 of FIG. 2 and operation 470 of FIG. 3, the SCSI I/O device 70 is not recognized since the PCI address bit 210 was not set by the SCSI I/O device 70. Since the PCI address bit 210 for the SCSI I/O device 70 is not set due to the presence of RAID adapter 10, the plug and play operating system will load a RAID device driver in operation 480 of FIG. 3 because the RAID adapter 10 would have set a PCI address bit 210 for itself when polled by the plug and play operating system.

The benefits resulting from the present invention are that the newer plug and play operating systems will load the proper device driver and receive the proper interrupts regardless of whether only a SCSI I/O device 70 is present on the computer base board 5 or a RAID adapter 10 is also plugged into the computer base board 5. Further, the example embodiments to route interrupts and mask the presence of a SCSI I/O device, when a RAID adapter is present, are simple to implement and therefore of low cost.

While we have shown and described only a few examples herein, it is understood that numerous changes and modifications as known to those skilled in the art could be made. For example, the logic employed in the example embodiments discussed maybe implemented in software, firmware or hardware without affecting the operation or functionality of the present invention. Therefore, we do not wish to be limited to the details shown and described herein, but intend to cover all such changes and modifications as are encompassed by the scope of the appended claims.

We claim:

1. A device to direct interrupts from a plurality of storage devices and install an appropriate device driver by a plug and play operating system to field the interrupts and control the plurality of disk drives, comprising:
    a SCSI I/O device connected to the plurality of storage devices having a plurality of interrupt signals and an identification selection signal;
    a PCI slot, to accept a RAID adapter, connected to the SCSI I/O device having a plurality of interrupt signals, an interrupt disable signal, and an identification disable signal; and
    a plurality of tristate units connected the plurality of interrupts from the SCSI I/O device, the identification selection, the interrupt disable signal, and the identification disable signal, wherein when the RAID adapter is plugged into the PCI slot the plurality of tristate units route the plurality of interrupts from the SCSI I/O device to the PCI slot and disable the identification selection signal so that the plug and play operating system does not recognize the SCSI I/O device.

2. The device as recited in claim 1, further comprising:
    a system interrupt controller to receive the plurality of interrupt signals from the SCSI I/O device and the PCI slot.

3. The device as recited in claim 2, wherein the interrupt disable signal is engaged when the RAID adapter is plugged into the PCI slot which disables the plurality of tristate units connected to the interrupt signals from the SCSI I/O device.

4. The device as recited in claim 3, wherein when the plurality of tristate units connected to the interrupt signals from the SCSI I/O device are disabled the interrupt signals from the SCSI I/O device are routed to the PCI slot in which the RAID adapter is plugged in.

5. The device as recited in claim 4, wherein the RAID adapter upon receiving the interrupt signals from the SCSI I/O device directs the interrupt signals to the system interrupt controller.

6. The device as recited in claim 1, further comprising:
    a PCI address bit to identify the presence of the SCSI I/O device by the plug and play operating system connected to the SCSI I/O device, at least one of the tristate units, and the identification disable signal.

7. The device as recited in claim 6, wherein the identification disable signal is engaged when the RAID adapter is plugged into the PCI slot.

8. The device as recited in claim 7, wherein when the identification disable signal is engaged the at least one method prevents the SCSI I/O device from setting the PCI address bit, wherein with PCI address bit not set the plug and play operating system does not load a device driver for the SCSI I/O device.

9. A method of directing interrupts from a plurality of storage devices and installing an appropriate device driver by a plug and play operating system to field the interrupts and control the plurality of disk drives, comprising:
    setting an interrupt disable signal when a RAID adapter is plugged in a PCI slot on a computer base board;
    setting an identification disable signal when a RAID adapter is plugged in a PCI slot on a computer base board;
    disabling a plurality of tristate units connected to a plurality of interrupt signals and a identification selection signal for a SCSI I/O device when the interrupt disable signal is set and the identification disable signal is set;
    routing the plurality of interrupts from the SCSI I/O device to the PCI slot when the interrupt disable signal is set and at least one of the plurality of tristate units is disabled; and
    disabling the identification selection signal from the SCSI I/O device when the identification disable signal is set and at least one of the plurality of tristate units is disabled, wherein the plug and play operating system will not load a device driver for the SCSI I/O device when the identification selection signal is disabled.

10. A method recited in claim 9, wherein the interrupt disable signal is engaged when the RAID adapter is plugged into the PCI slot which disables the plurality of tristate units connected to the interrupt signals from the SCSI I/O device.

11. The method as recited in claim 10, wherein when the plurality of tristate units connected to the interrupt signals from the SCSI I/O device are disabled, the interrupt signals from the SCSI I/O device are routed to the PCI slot in which the RAID adapter is plugged in.

12. The method as recited in claim 11, wherein the RAID adapter upon receiving the interrupt signals from the SCSI I/O device directs the interrupt signals to a system interrupt controller.

13. The method as recited in claim 9, further comprising:
    identifying the presence of the SCSI I/O device by the plug and play operating system connected to the SCSI I/O device based on a PCI address bit to at least one of the tristate units, and the identification disable signal.

14. The method as recited in claim 13, wherein the identification disable signal is engaged when the RAID adapter is plugged into the PCI slot.

15. A device to direct interrupts from a plurality of storage devices and install an appropriate device driver by a plug and play operating system to field the interrupts and control the plurality of disk drives, comprising:
    a SCSI enable module to route a plurality of interrupt signals from a SCSI I/O device on a computer base board to a system interrupt controller and to set a PCI address bit for the SCSI I/O device that identifies the presence of the SCSI I/O device to the plug and play operating system when a RAID adapter is not plugged into a PCI slot on the computer base board, wherein the plug and play operating system loads a device driver for the SCSI I/O device; and
    a SCSI disable module to route a plurality of interrupt signals from the SCSI I/O device on the computer base board to a PCI slot and to not set a PCI address bit for the SCSI I/O device so that the plug and play operating system does not recognize the presence of the SCSI I/O device when the RAID adapter is plugged into the PCI slot on the computer base board, wherein the plug and play operating system does not load a device driver for the SCSI I/O device.

16. The method as recited in claim 15, wherein when the identification disable signal is engaged the at least one method prevents the SCSI I/O device from setting the PCI address bit, wherein with PCI address bit not set the plug and play operating system does not load a device driver for the SCSI I/O device.

17. The device recited in claim 15, wherein the SCSI enable module further comprises:

- an identification selection signal connected to the SCSI I/O device;
- a plurality of interrupt signals, an interrupt disable signal, and an identification disable signal connected to the PCI slot;
- a plurality of tristate units connected the plurality of interrupts from the SCSI I/O device, the identification selection, the interrupt disable signal, and the identification disable signal, wherein when the RAID adapter is not plugged into the PCI slot, the plurality of tristate units route the plurality of interrupts to the system interrupt controller and enable the identification selection signal so that the plug and play operating system recognizes the SCSI I/O device.

18. The device recited in claim 15, wherein the SCSI disable module further comprises:

- an identification selection signal connected to the SCSI I/O device;
- a plurality of interrupt signals, an interrupt disable signal, and an identification disable signal connected to the PCI slot;
- a plurality of tristate units connected the plurality of interrupts from the SCSI I/O device, the identification selection, the interrupt disable signal, and the identification disable signal, wherein when the RAID adapter is plugged into the PCI slot the plurality of tristate units route the plurality of interrupts from the SCSI I/O device to the PCI slot and disable the identification selection signal so that the plug and play operating system does not recognize the SCSI I/O device.

* * * * *